(12) United States Patent
Wirth

(10) Patent No.: US 9,452,820 B1
(45) Date of Patent: Sep. 27, 2016

(54) UNMANNED AERIAL VEHICLE

(71) Applicant: Wirth Research Limited, Bicester, Oxfordshire (GB)

(72) Inventor: Nicholas J. P. Wirth, Whittlebury (GB)

(73) Assignee: Wirth Research Limited, Bicester, Oxfordshire (GB)

( * ) Notice: Subject to any disclaimer, the term of this patent is extended or adjusted under 35 U.S.C. 154(b) by 0 days.

(21) Appl. No.: 14/924,304

(22) Filed: Oct. 27, 2015

(30) Foreign Application Priority Data

Aug. 13, 2015 (GB) .................................. 1514386.0

(51) Int. Cl.
  *B64C 3/56* (2006.01)
  *B64C 3/16* (2006.01)
  *B64C 39/02* (2006.01)

(52) U.S. Cl.
  CPC . *B64C 3/56* (2013.01); *B64C 3/16* (2013.01); *B64C 39/024* (2013.01); *B64C 2201/021* (2013.01); *B64C 2201/102* (2013.01); *B64C 2201/141* (2013.01); *B64C 2201/146* (2013.01)

(58) Field of Classification Search
  CPC ........... B64C 3/38; B64C 3/385; B64C 3/54; B64C 3/546; B64C 3/56; B64C 9/34; B64C 9/36; B64C 27/022; B64C 27/50; B64C 39/006; B64C 39/024; B64C 39/08; B64C 2201/102
  See application file for complete search history.

(56) References Cited

U.S. PATENT DOCUMENTS

| 5,615,847 A | 4/1997 | Bourlett |
| 8,444,082 B1 | 5/2013 | Foch |
| 2012/0280080 A1* | 11/2012 | Lubenow ............... B64C 39/024 244/49 |

FOREIGN PATENT DOCUMENTS

| WO | 2005023642 A2 | 3/2005 |
| WO | 2014035518 A2 | 3/2014 |

OTHER PUBLICATIONS

Search Report issued by UK Intellectual Property Office in related UK Patent Ap. GB1514386.0 on Jan. 18, 2016 (3 sheets).

* cited by examiner

*Primary Examiner* — Nicholas McFall
(74) *Attorney, Agent, or Firm* — Gesmer Updegrove LLP

(57) ABSTRACT

An unmanned aerial vehicle 2 comprising: a fuselage 4; and a wing 6 comprising a central wing section 12 pivotably mounted to the fuselage 4 and a pair of outer wing sections 14a, 14b pivotably mounted to the central wing section 12; wherein the wing 6 has a folded configuration in which the central wing section 12 and the outer wing sections 14a, 14b are stacked on top of one another and are aligned with a longitudinal axis of the fuselage 4; and a deployed configuration in which the central wing section 12 is substantially perpendicular to the fuselage 4 and the outer wing sections 14a, 14b extend from the central wing section 12 away from the fuselage 4.

10 Claims, 4 Drawing Sheets

1

UNMANNED AERIAL VEHICLE

CROSS-REFERENCE TO RELATED APPLICATIONS

The present application claims priority to GB 1514386.0 filed on 13 Aug. 2015, which is hereby incorporated by reference in its entirety for any and all purposes.

BACKGROUND

The disclosure relates to an unmanned aerial vehicle (UAV) and a folding mechanism of aerofoil components for an unmanned aerial vehicle.

The design of UAVs has seen great advancement in recent years. The field grew mainly out of military development, where UAVs are commonly used for surveillance, but has expanded further into commercial uses, such as in delivery and filmmaking, which enforces a position at the forefront of technological research. UAVs have been developed in various forms, such as single- or multi-rotor helicopters or fixed wing aircraft. With the evolution of ever decreasing electronic and mechanical components, micro- and even nano-versions of UAVs continue to be developed.

One issue with the development of UAVs is that there are advantages to having large wingspans or sizeable rotors in comparison to their fuselage length. These advantages include the ability to create low drag fixed wing aircraft, which allow for long flight times. Any aircraft with a large span will cause problems when it comes to transportation, which has led to disassemblable and foldable designs.

It may be useful to transport the UAV in existing available storage, which in military uses, may be on larger aircraft, ships or submarines. Another problem arises when it comes to launch procedure. While launch devices are available for missiles and other munitions, they may not be available for specific UAV designs and it may not necessarily be possible to perform a horizontal takeoff.

It is therefore desirable to provide a UAV which overcomes some or all of the disadvantages associated with existing designs.

SUMMARY

In accordance with an aspect there is provided an unmanned aerial vehicle comprising: a fuselage; and a wing comprising a central wing section pivotably mounted to the fuselage and a pair of outer wing sections pivotably mounted to the central wing section; wherein the wing has: a folded configuration in which the central wing section and the outer wing sections are stacked on top of one another and are aligned with a longitudinal axis of the fuselage; and a deployed configuration in which the central wing section is substantially perpendicular to the fuselage and the outer wing sections extend from the central wing section away from the fuselage.

The unmanned aerial vehicle may further comprise a second pair of outer wing sections pivotably mounted to the first pair of outer wing sections.

At least one of the outer wing sections may move vertically during a transition from the folded configuration to the deployed configuration such that the outer wing sections are aligned with one another when in the deployed configuration.

The outer wing sections may move vertically during a transition from the folded configuration to the deployed

2 configuration such that the outer wing sections are aligned with one another and the central wing section when in the deployed configuration.

The outer wing elements may be angled relative to the central wing section when in the deployed configuration such that the wing has a dihedral or anhedral angle.

The wing may be biased towards the deployed configuration.

The central wing section may be biased by means of a torsion spring.

The fuselage may comprise a stop which limits rotation of the central wing section relative to the fuselage.

Each of the outer wing sections may be biased by means of a tension spring.

The tension spring may be connected at one end to the central wing section and at the other end to the outer wing section via a pulley such that rotation of the outer wing section relative to the central wing section extends the tension spring.

The unmanned aerial vehicle may further comprise a latch which holds the wing in the folded configuration against the bias and which is released so as to allow the wing to be deployed.

The latch may be released remotely or automatically (e.g. immediately after launch or after a fixed time from launch).

The vehicle may housed within a tube which retains the wing in the folded configuration.

The wing may be unfolded into the deployed configuration when released from within the tube.

BRIEF DESCRIPTION OF THE DRAWINGS

Embodiments will now be described, by way of example, with reference to the accompanying drawings, in which:—

DETAILED DESCRIPTION

Figure 1:
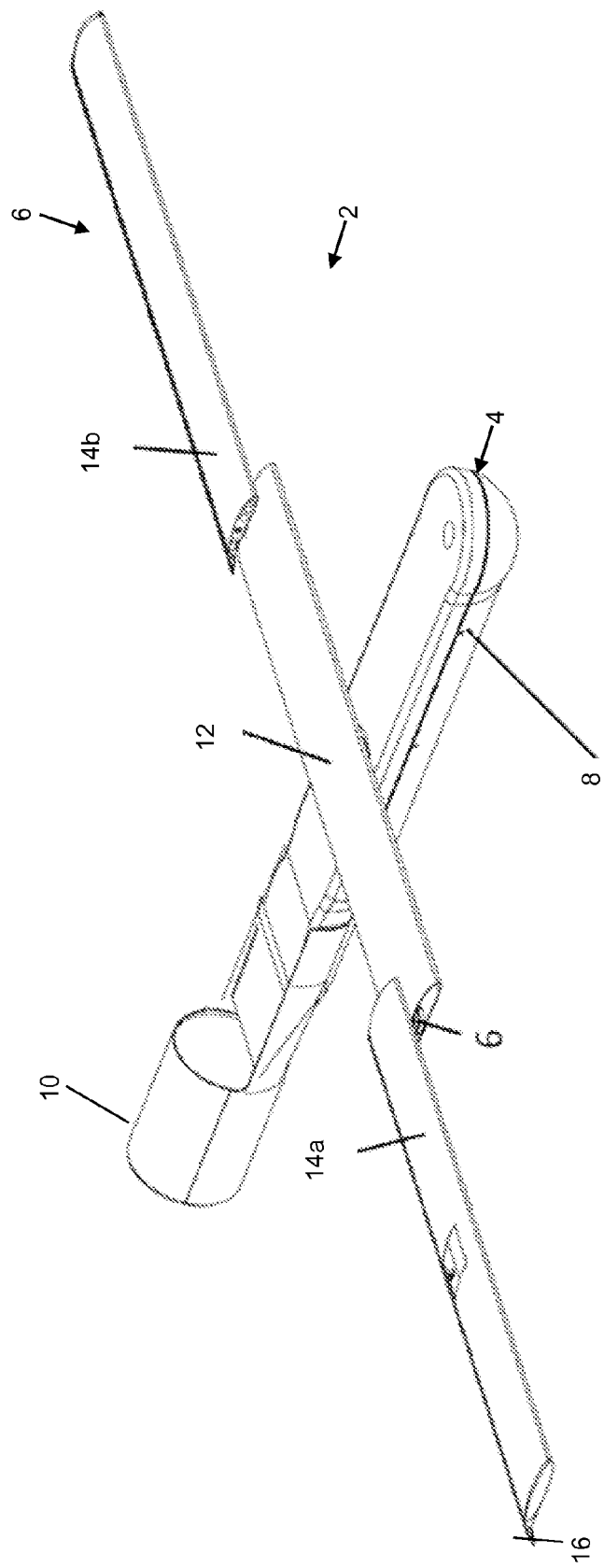
FIG. 1 is a perspective view of a UAV according to an embodiment.

FIG. 1 shows a UAV 2 according to an embodiment. The UAV 2 generally comprises a fuselage 4 on which is mounted a wing 6.

As shown, the fuselage 4 comprises a semicylindrical front section 8 and a cylindrical rear section 10. At least part of the fuselage 4 may be hollow so as to house the electronics and the engine of the UAV 2.

The wing 6 is mounted to the front section 8 of the fuselage midway along the length of the front section 8. The wing 6 comprises a central wing section 12 and first and second outer wing sections 14a, 14b. The central wing section 12 and the outer wing sections 14a, 14b each have an aerofoil profile to provide lift to the UAV 2. The outer wing sections 14a, 14b are also provided with ailerons 16 to allow for control of the UAV 2.

The central wing section 12 is pivotably connected at its centre to the front section 8 of the fuselage 4. In turn, the outer wing sections 14a, 14b are pivotably connected to the central wing section 12. Specifically, the first outer wing section 14a is connected via one of its ends to the central wing section 12 at or near a distal, free end of the central wing section 12. Similarly, the second outer wing section 14b is connected via one of its ends to the central wing section 12 at or near an opposing distal, free end of the central wing section 12.

Figure 2:
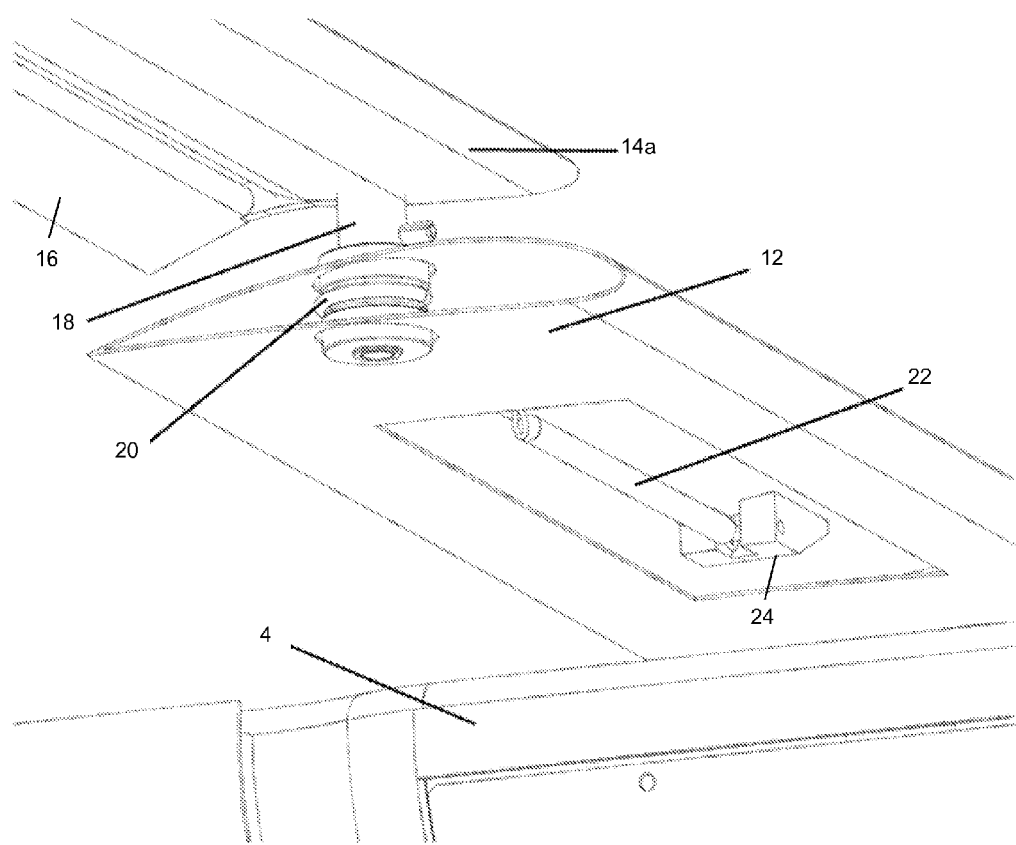
FIG. 2 is a perspective view showing the outer wing pivoting mechanism.

In particular, as shown in FIG. 2, the outer wing sections 14a, 14b are each provided with a shaft 18 which projects from an underside of the outer wing section 14a, 14b. The shaft 18 is received by a bearing 20 located within the central wing section 12 which allows for rotation of the outer wing section 14a, 14b relative to the central wing section 12. The shaft 18 is connected to a bias mechanism located within the central wing section 12. The bias mechanism comprises a tension spring 22 which is fixed at one end to a bracket 24 located within the central wing section 12. The other end of the tension spring 22 is coupled to a pulley disposed on the shaft 18 via a string 26 (see FIG. 4). Accordingly, rotation of the shaft 18 causes the tension spring 22 to be extended and thus placed under tension.

Figure 3:
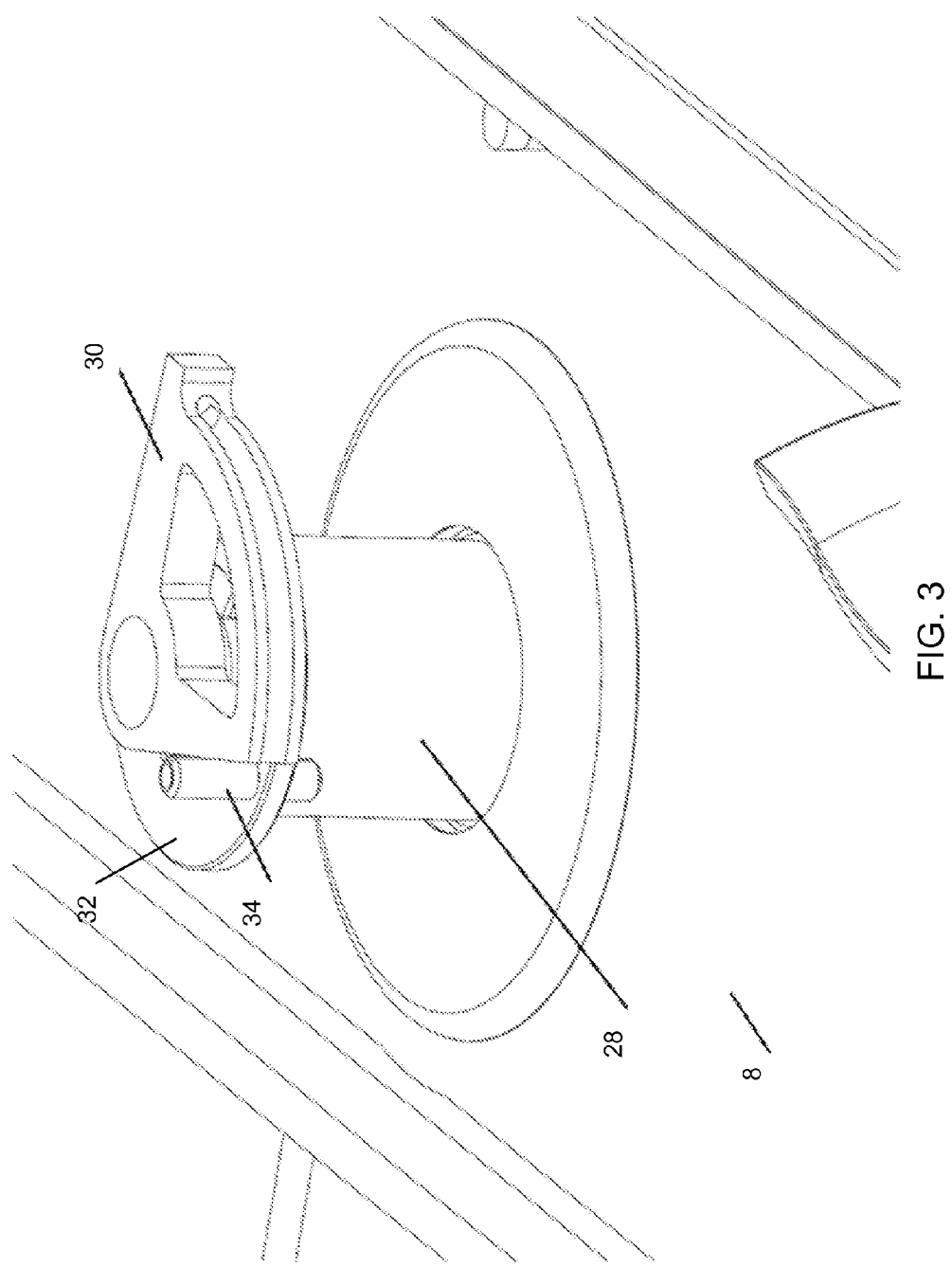
FIG. 3 is a perspective view showing a central wing pivoting mechanism within the fuselage.

As shown in FIG. 3, the central wing section 12 comprises a shaft which extends into the interior of the front section 8 of the fuselage 4 where it passes through a boss 28. The free end of the shaft located within the front section 8 of the fuselage 4 is connected to a mount 30 which in turn is connected to a torsion spring (not shown). The mount 30 has the form of a circular sector having a pair of radial surfaces connected by an arcuate surface. The torsion spring is attached to the mount 30 via the arcuate surface. The boss 28 has a flange 32 from which a stop 34 projects into the plane of the mount 30. The stop 34 limits rotation of the mount 30 (through contact with one of the radial surfaces of the mount 30) and thus of the central wing section 12.

Figure 4:
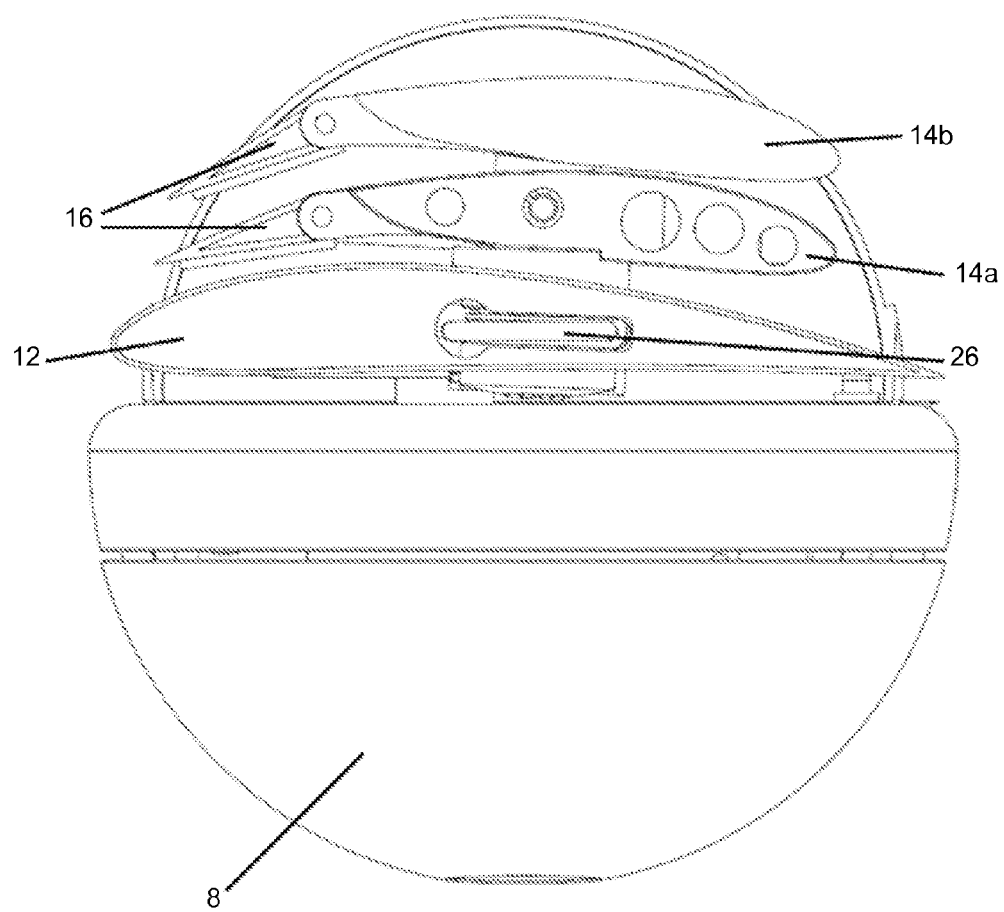
FIG. 4 is a front view of the UAV with the wings in a retracted position.

As described previously, the central wing section 12 is pivotably connected to the fuselage 4 and the outer wing sections 14a, 14b are in turn pivotably connected to the central wing section 12. As a result, the wing 6 can be folded such that the outer wing sections 14a, 14b are rotated so that they overlap with the central wing section 12 and the central wing section 12 can then be rotated so as to align its longitudinal axis with that of the fuselage 4. As shown in FIG. 4, the central wing section 12 and the outer wing sections 14a, 14b are thus stacked on top of one another. To allow this, the outer wing sections 14a, 14b are offset vertically from the central wing section 12 by different distances, at least when in the folded configuration. The pivotable connection between the outer wing sections 14a, 14b and the central wing section 12 may be arranged such that the outer wing sections 14a, 14b are vertically level with one another when deployed. The outer wing sections 14a, 14b may also be level with the central wing section 12 when in the deployed configuration. For example, the opposing ends of the outer wing sections 14a, 14b and the central wing section 12 may be angled so as to cause the outer wing sections 14a, 14b to ride up over the central wing section 12 when folded.

As shown in FIG. 4, the central wing section 12 and the outer wing sections 14a, 14b combined with the semicylindrical front section 8 of the fuselage 4 occupy a substantially cylindrical domain when in the folded configuration.

The torsion spring and tension spring 22 bias the central wing section 12 and the outer wing sections 14a, 14b towards the deployed configuration where they are aligned with one another and perpendicular to the longitudinal axis of the fuselage 4 (as depicted in FIG. 1). Therefore, the central wing section 12 and the outer wing sections 14a, 14b must be restrained in order to retain the wing in the folded configuration. For example, the UAV 2 may be housed within a tube which prevents the wing 6 from being deployed. However, once released, the wing automatically unfolds into the deployed configuration. Specifically, the central wing section 12 is rotated 90° about the fuselage 4 and the outer wing sections 14a, 14b are rotated 180° relative to the central wing section 12. The unfolding of the wing 6 can thus be performed post-launch, extending in mid-air and transitioning to the flight phase.

Although the outer wing sections 14a, 14b have been described as being aligned with the central wing section 12 when in the deployed configuration, they may instead be swept backward. The wing 6 may be arranged so as to provide a dihedral or anhedral angle with respect to the fuselage 4. This may increase stability in sideslip conditions. This may be created by the central wing section 12 or from the outer wing sections 14a, 14b. In particular, the outer wing sections 14a, 14b may be deflected upwards (dihedral) or downwards (anhedral) as they pivot relative to the central wing section 12, such that they are parallel with the central wing section 12 when folded and angled when deployed.

In other embodiments, the wing 6 may comprise additional wing sections in order to increase the length of the wing 6 relative to the folded dimensions of the UAV 2.

Although the fuselage 4 has been described as comprising a semicylindrical front section 8 and a cylindrical rear section 10, it will be appreciated that the shape of the fuselage 4 may vary. In particular, the cross-section of the fuselage 4 may be constant (i.e. the same shape and/or dimensions) along its entire length. It also need not be curved. The UAV 2 may therefore be stored and/or deployed within a non-circular housing.

The unfolding of the wing 6 need not be automatic and may instead be triggered electronically, either by timing after launch or by a remote user. For example, the UAV 2 may comprise a latch which fixes the wing 6 in the folded configuration against the bias of the torsion spring and tension spring 22, and is released to allow the wing 6 to unfold. Further, the wing 6 may be deployed using any power source and is not limited to the use of springs. In particular, the wing 6 may be actuated using solenoids, gas springs, pyrotechnics, electric motors, etc. The deployment of the wing 6 may also be initiated through aerodynamic or inertial forces.

The wing 6 may have an aerofoil cross-section only over part of its length. In particular, only a portion of the central wing section 12 may have an aerofoil cross-section and outer wing sections 14a, 14b The invention is not limited to the embodiments described herein, and may be modified or adapted without departing from the scope of the present invention.

The invention claimed is:

1. An unmanned aerial vehicle comprising:
   a fuselage; and
   a wing comprising a single central wing section pivotably mounted to the fuselage and a pair of outer wing sections pivotably mounted to the central wing section;
   wherein the wing has a folded configuration in which the central wing section and the outer wing sections are stacked on top of one another and are aligned with a longitudinal axis of the fuselage, and a deployed configuration in which the central wing section is substantially perpendicular to the fuselage and the outer wing sections extend from the central wing section away from the fuselage.

2. An unmanned aerial vehicle as claimed in claim 1, wherein at least one of the outer wing sections moves vertically during a transition from the folded configuration to the deployed configuration such that the outer wing sections are aligned with one another when in the deployed configuration.

3. An unmanned aerial vehicle as claimed in claim 1, wherein the outer wing sections move vertically during a transition from the folded configuration to the deployed configuration such that the outer wing sections are aligned with one another and the central wing section when in the deployed configuration.

4. An unmanned aerial vehicle as claimed in claim 1, wherein the wing is biased towards the deployed configuration.

5. An unmanned aerial vehicle as claimed in claim 4, wherein the central wing section is biased by means of a torsion spring.

6. An unmanned aerial vehicle as claimed in claim 5, wherein the fuselage comprises a stop which limits rotation of the central wing section relative to the fuselage.

7. An unmanned aerial vehicle as claimed in claim 4, wherein each of the outer wing sections is biased by means of a tension spring.

8. An unmanned aerial vehicle as claimed in claim 7, wherein the tension spring is connected at one end to the central wing section and at the other end to the outer wing section via a pulley such that rotation of the outer wing section relative to the central wing section extends the tension spring.

9. An unmanned aerial vehicle as claimed in claim 1, wherein the vehicle is housed within a tube which retains the wing in the folded configuration.

10. An unmanned aerial vehicle as claimed in claim 9, wherein the wing is unfolded into the deployed configuration when released from within the tube.

* * * * *